United States Patent [19]

Naylor et al.

[11] 4,294,060
[45] Oct. 13, 1981

[54] SWEET FORMING AND WRAPPING MACHINE

[75] Inventors: Arthur V. Naylor, Seacroft; John K. Spencer, Gainsborough, both of England

[73] Assignee: Baker Perkins Holdings Limited, Peterborough, England

[21] Appl. No.: 30,837

[22] Filed: Apr. 17, 1979

Related U.S. Application Data

[63] Continuation-in-part of Ser. No. 877,290, Feb. 13, 1978, abandoned.

[30] Foreign Application Priority Data

Feb. 18, 1977 [GB] United Kingdom ................. 6822/77

[51] Int. Cl.³ .............................................. B65B 57/02
[52] U.S. Cl. ......................................... 53/506; 53/234
[58] Field of Search ..................... 53/506, 516, 53, 54, 53/521, 234

[56] References Cited

U.S. PATENT DOCUMENTS

| 1,659,143 | 2/1928 | Hopkins | 53/506 X |
| 1,758,468 | 5/1930 | Rose | 53/516 |
| 1,861,510 | 6/1932 | Rose | 53/516 |
| 2,879,636 | 3/1959 | Zuercher | 53/53 X |
| 4,079,572 | 3/1978 | Vande Castle | 53/53 |
| 4,135,344 | 1/1979 | Seragnori | 53/54 |

FOREIGN PATENT DOCUMENTS 1347131 2/1974 United Kingdom ................. 53/516

Primary Examiner—John Sipos
Attorney, Agent, or Firm—Fitzpatrick, Cella, Harper & Scinto

[57] ABSTRACT

A sweet-forming and wrapping machine includes feed rollers for feeding a rope of candy to a cutting mechanism and mechanism for transferring sweets cut from the leading end of the rope to a wrapping wheel, a wrapper being fed into the path of transfer of each sweet to the wrapping wheel. A detector operates in response to failure of the wrapper feed to stop the machine and also to divert the rope instantaneously out of its normal path of travel towards the cutting mechanism.

3 Claims, 2 Drawing Figures

SWEET FORMING AND WRAPPING MACHINE

BACKGROUND OF THE INVENTION

This Application is a continuation-in-part of our U.S. Patent Application No. 877,290, filed Feb. 13th 1978 now abandoned.

This invention relates to a sweet-forming and wrapping machine of the type comprising a wrapping mechanism, feed mechanism for feeding a rope of candy or like confectionery towards the wrapping mechanism, cutting mechanism for severing sweets in succession from the leading end of the rope, means for transferring the sweets individually and in succession to the wrapping mechanism, means for feeding wrappers in succession into the path of transfer of the sweets so that each sweet enters the wrapping mechanism with a wrapper partially folded around it, and a detector operative in the event of failure of the wrapper feed to stop the drive motor of the machine.

In this type of machine it is usual to sever the individual wrappers in succession from a continuous web of wrapping material and the detector detects the interruption of the supply of wrapping material resulting, for example, from breakage or exhaustion of the web.

When the detector actuates a motor stopping switch, particularly in the case of up-to-date high speed machinery capable of producing 1000 sweets per minute or more, the overrun of the machine, which is primarily due to the inertia of the wrapping mechanism and necessarily occurs between the actuation of the motor stopping switch and the actual stoppage of the machine, complete the wrapping of partially wrapped sweets and often causes unwrapped sweets to pass to the wrapping mechanism and into contact with subsequent folding elements of the machine and, since the rope at this stage is still in a "tacky" or even a sticky condition, cleaning operations need to be performed on the folding mechanism in general before production can be re-started.

The object of the present invention is to alleviate, if not entirely obviate, this difficulty.

SUMMARY OF THE INVENTION

It has now been found that passage of unwrapped sweets to the wrapping mechanism in the event of failure of the wrapper feed and due to overrun of the machine after the drive motor has stopped can be prevented by providing mechanism operative in response to detection of the wrapper feed to divert the rope immediately from its normal path of travel towards the cutting mechanism so that, notwithstanding the fact that the rope continues to be fed due to inertia and overrun of the machine, pieces will no longer be cut from it which could be fed free from a wrapper into the wrapping mechanism. Such diversion of the rope may be accomplished by pivotal movement of part of a channel along which the rope is fed towards the cutting mechanism.

DESCRIPTION OF THE DRAWING

A preferred embodiment of the invention is illustrated in the accompanying schematic drawing, in which.

DESCRIPTION OF THE PREFERRED EMBODIMENT

Figure 2:
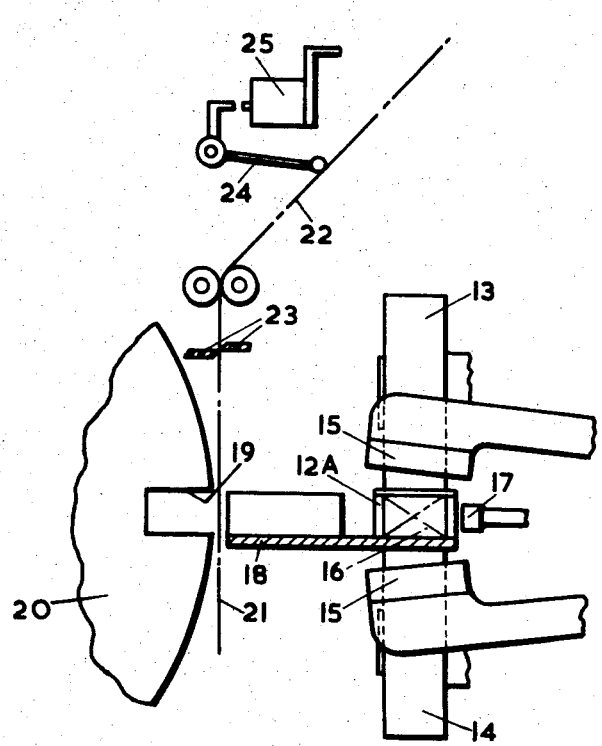
FIG. 2 is a cross section illustrating transfer of a sweet and a wrapper to the wrapping mechanism.

As shown in the drawing a rope 11 of candy, supplied from a known type of batch rolling machine, not shown, is fed along a feed channel 12 by upper and lower feed rollers, 13 and 14 respectively, to a cutting mechanism constituted by a pair of knives 15. The feed rollers 13, 14 are driven in known manner from the main drive shaft (not shown) of the machine in timed relationship with the operation of the knives 15 and of sweet-transfer and wrapping mechanism illustrated in FIG. 2.

The knives 15 operate in conventional fashion to sever successive sweets 16 from the leading end of the rope 11 and the sweets 16 are transferred, by a reciprocating pusher 17, in a direction transverse to the direction of feed of the rope along a guide 18 into successive pockets 19 of an intermittently rotating wrapping wheel 20. As each sweet 16 enters a pocket 19, a wrapper 21, severed from a web 22 of wrapping material by knives 23, is carried with and partially wrapped around the sweet as the sweet enters the pocket. The wrapping operation is completed in known manner during subsequent rotation of the wrapping wheel 20.

A pivoted detector arm 24 rests freely on the web 22 and, in the event of breakage or exhaustion of the web, pivots to actuate a switch 25 to stop the machine drive.

Figure 1:
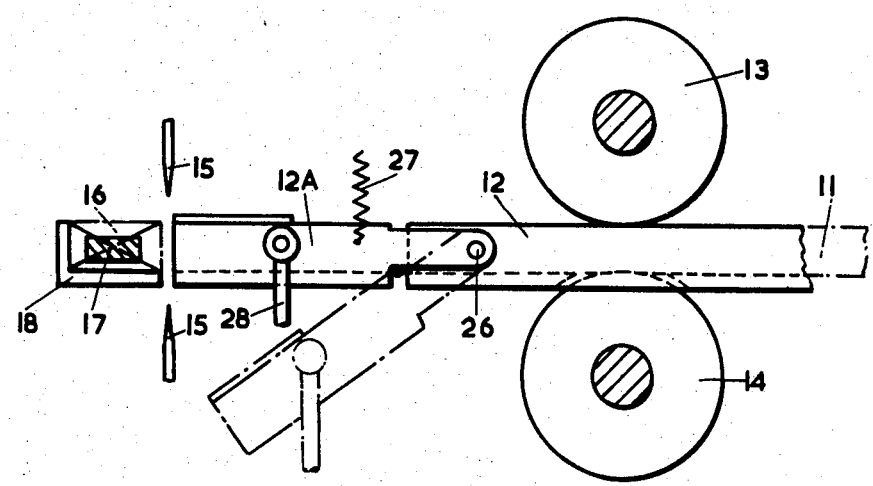
FIG. 1 is a side elevation, partly in section, showing the rope feeding mechanism of the machine.

The end portion 12A of the feed channel is pivoted at 26 to the main portion 12 of the channel and is normally retained by a spring 27 in the position, shown in full lines in FIG. 1, in which it is in alignment with said main portion to feed the rope 11 to the knives 15. When the switch 25 is actuated by the detector arm 24 in response to detection of a failure in the wrapper feed, a solenoid (not shown) is energised to impart downward movement to a link 28 connected to the portion 12A of the feed channel to cause the latter to move downwardly into the position shown in chain-dotted lines in FIG. 1 so diverting the rope 11 from its normal path of travel towards the knives 15. Notwithstanding, therefore, that the feed rollers 13, 14 continue to rotate and feed the rope 11 as the result of overrun of the machine following operation of the switch 25, no sweets are cut from the leading end of the rope or able to enter a pocket 19 of the wrapping wheel devoid of a wrapper. At the same time the drive mechanism of the machine is stopped and the machine overrun completes the wrapping of partially wrapped sweets.

The diverted end of the rope is cut off at the point of emergence from the portion 12A of the feed channel when the machine has stopped. When the fault in the wrapper feed has been corrected and the machine is restarted, the switch 25 and therefore the solenoid are deactivated and the spring 27 returns the portion 12A of the feed channel to the position shown in full lines to restore the normal path of feed of the rope 11 to the knives 15.

What is claimed is:

1. In a sweet-forming and wrapping machine comprising a wrapping mechanism, a feed channel for feeding a rope of candy in a normal path of travel towards the wrapping mechanism, feed rollers for advancing the rope along said feed channel, cutting means for severing sweets in succession from the leading end of the rope, means for transferring the sweets in succession into the wrapping mechanism, means for feeding wrappers in succession into the path of travel of the sweets so that each sweet enters the wrapping mechanism with a wrapper partially folded about it drive means for driving said machine, a detector for sensing the feed of the wrappers and a machine stopping switch operable instantaneously by said detector to stop said machine drive in response to detection of a failure in the wrapper feed, the improvement which consists in the provision, in a machine capable of running at such a high speed that the wrapping mechanism overruns an amount sufficient to complete wrapping of partially wrapped sweets following the stopping of said machine drive by said stopping switch, of means responsive instantaneously to operation of said machine stopping switch by said detector to immediately divert said rope out of its normal path of travel and away from said cutting means, notwithstanding the overrun of said wrapping mechanism following the stopping of said machine drive.

2. A machine according to claim 1, wherein said feed channel comprises a main portion and an end portion pivoted to said main portion, and wherein said responsive means includes a link connected to said end portion and operative, in response to operation of said switch to pivot said end portion into a position out of alignment with said main portion.

3. A machine according to claim 1, wherein said machine operates at a speed sufficient to produced in the order of 1000 or more sweets per minute.

* * * * *